(12) United States Patent
Truong et al.

(10) Patent No.: US 11,548,219 B2
(45) Date of Patent: Jan. 10, 2023

(54) APPARATUS AND METHODS FOR CONTROLLED VALIDATION OF ADDITIVE MANUFACTURING SYSTEMS

(71) Applicant: Carbon, Inc., Redwood City, CA (US)

(72) Inventors: Ronald A. Truong, Belmont, CA (US); John R. Tumbleston, Menlo Park, CA (US); Kyle Laaker, Redwood City, CA (US); Bob E. Feller, San Mateo, CA (US); Joshua D. Deetz, Gilroy, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/315,899

(22) Filed: May 10, 2021

(65) Prior Publication Data

US 2021/0354378 A1 Nov. 18, 2021

Related U.S. Application Data

(60) Provisional application No. 63/025,230, filed on May 15, 2020.

(51) Int. Cl.
*B29C 64/176* (2017.01)
*B29C 64/124* (2017.01)
(Continued)

(52) U.S. Cl.
CPC .......... *B29C 64/176* (2017.08); *B29C 64/124* (2017.08); *B29C 64/386* (2017.08);
(Continued)

(58) Field of Classification Search
None
See application file for complete search history.

(56) References Cited

U.S. PATENT DOCUMENTS 4,785,075 A 11/1988 Shimp
4,951,648 A 8/1990 Shukla et al.
(Continued)

FOREIGN PATENT DOCUMENTS

WO 2015164234 A1 10/2015
WO 2016133759 A1 8/2016
(Continued)

OTHER PUBLICATIONS

Janusziewicz, Rima, et al., "Layerless fabrication with continuous liquid interface production", PNAS, 113, 2016, 11703-11708.
(Continued)

*Primary Examiner* — Yung-Sheng M Tsui
(74) *Attorney, Agent, or Firm* — Myers Bigel, P.A.

(57) ABSTRACT

A method of improving production performance of an additive manufacturing system includes obtaining a first production plan and a second production plan, different from the first production plan, for the manufacture of a plurality of objects using a fleet of additive manufacturing apparatus, automatically generating a first allocation of a first quantity of the plurality of objects to the fleet of additive manufacturing apparatus using the first production plan, automatically generating a second allocation of a second quantity of the plurality of objects to the fleet of additive manufacturing apparatus using the second production plan, comparing a production performance of the first and second quantity of the plurality of objects after being manufactured by the fleet of additive manufacturing apparatus, and based on the comparison of the production performance, automatically regenerating the first and second allocations to change the first and second quantities.

20 Claims, 7 Drawing Sheets

(51) Int. Cl.
    *B33Y 50/00*     (2015.01)
    *B33Y 10/00*     (2015.01)
    *B33Y 30/00*     (2015.01)
    *B29C 64/386*     (2017.01)

(52) U.S. Cl.
    CPC ............... *B33Y 10/00* (2014.12); *B33Y 30/00* (2014.12); *B33Y 50/00* (2014.12)

(56) References Cited

U.S. PATENT DOCUMENTS

| | | | |
|---|---|---|---|
| 5,179,265 A | 1/1993 | Sheridan et al. | |
| 5,196,137 A | 3/1993 | Merchant | |
| 5,197,375 A | 3/1993 | Rosenbrock et al. | |
| 5,236,637 A | 8/1993 | Hull | |
| 5,248,456 A | 9/1993 | Evans et al. | |
| 5,391,072 A | 2/1995 | Lawton et al. | |
| 5,482,659 A | 1/1996 | Sauerhoefer | |
| 5,529,473 A | 6/1996 | Lawton et al. | |
| 5,773,403 A | 6/1998 | Hijino et al. | |
| 5,824,634 A | 10/1998 | Merchant | |
| 6,008,179 A | 12/1999 | Flynn et al. | |
| 6,288,018 B1 | 9/2001 | Flynn et al. | |
| 6,426,327 B1 | 7/2002 | Flynn et al. | |
| 6,646,020 B2 | 11/2003 | Nyberg et al. | |
| 6,660,208 B2 | 12/2003 | Hanna | |
| 6,689,734 B2 | 2/2004 | Doyel et al. | |
| 6,699,829 B2 | 3/2004 | Doyel et al. | |
| 6,753,304 B1 | 6/2004 | Barthelemy et al. | |
| 6,799,712 B1 | 10/2004 | Austen et al. | |
| 6,996,245 B2 | 2/2006 | Hanna | |
| 7,438,846 B2 | 10/2008 | John | |
| 7,892,474 B2 | 2/2011 | Shkolnik et al. | |
| 7,897,558 B1 | 3/2011 | Arafat | |
| 8,110,135 B2 | 2/2012 | El-Siblani | |
| 8,120,468 B2 | 2/2012 | Kangas | |
| 8,526,910 B2 | 9/2013 | Messerly | |
| 8,529,703 B2 | 9/2013 | Kabashima et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,373,201 B2 | 6/2016 | Jefferies et al. | |
| 9,453,142 B2 | 9/2016 | Rolland et al. | |
| 9,562,429 B2 | 2/2017 | Walton et al. | |
| 9,576,476 B2 | 2/2017 | Yang | |
| 9,587,487 B2 | 3/2017 | Walton et al. | |
| 9,589,428 B2 | 3/2017 | Edwards et al. | |
| 9,595,058 B2 | 3/2017 | Khalid | |
| 9,598,606 B2 | 3/2017 | Rolland et al. | |
| 9,676,963 B2 | 6/2017 | Rolland et al. | |
| 10,259,171 B2 | 4/2019 | Robeson et al. | |
| 10,434,706 B2 | 10/2019 | Robeson et al. | |
| 2013/0292862 A1 | 11/2013 | Joyce | |
| 2013/0295212 A1 | 11/2013 | Chen et al. | |
| 2013/0329258 A1* | 12/2013 | Pettis | B29C 64/112 358/1.15 |
| 2015/0209198 A1 | 7/2015 | Aizenberg et al. | |
| 2015/0331402 A1 | 11/2015 | Lin et al. | |
| 2015/0360419 A1 | 12/2015 | Willis et al. | |
| 2016/0129636 A1* | 5/2016 | Cudak | G05B 19/4099 700/97 |
| 2016/0288376 A1 | 10/2016 | Sun et al. | |
| 2017/0090462 A1* | 3/2017 | Dave | B33Y 50/00 |
| 2017/0129167 A1 | 5/2017 | Castanon | |
| 2017/0129169 A1 | 5/2017 | Batchelder et al. | |
| 2018/0099460 A1* | 4/2018 | Iverson | B33Y 50/02 |
| 2018/0126630 A1 | 5/2018 | Panzer et al. | |
| 2018/0243976 A1 | 8/2018 | Feller | |
| 2018/0290374 A1 | 10/2018 | Willis et al. | |
| 2019/0160733 A1 | 5/2019 | Mirkin et al. | |

FOREIGN PATENT DOCUMENTS

| | | | | |
|---|---|---|---|---|
| WO | | 2016145182 A1 | 9/2016 | |
| WO | | 2017210298 A1 | 12/2017 | |
| WO | WO-2020091746 A1 * | | 5/2020 | ........... B29C 64/393 |

OTHER PUBLICATIONS

Tumbleston, John R., et al., "Continuous liquid interface production of 3D Objects", Science, 347(6228), 2015, 1349-1352.

Christian, Brian, "The A/B Test: Inside the Technology That's Changing the Rules of Business: Want to build a perfect website? Forget instincts—trust the data. Forget the designers—trust the audience", Wired.com; Retrieved from: https://www.wired.com/2012/04/ff-abtesting/, Apr. 25, 2012, (17 pages).

Gallo, Amy, "A Refresher on A/B Testing", Harvard Business Review; Retrieved from: https://hbr.org/2017/06/a-refresher-on-ab-testing, Jun. 29, 2017, (8 pages).

Kohavi, Ron, et al., "Online Controlled Experiments and A/B Tests", Encyclopedia of Machine Learning and Data Mining, 1-11, 2015.

* cited by examiner

APPARATUS AND METHODS FOR CONTROLLED VALIDATION OF ADDITIVE MANUFACTURING SYSTEMS

CROSS-REFERENCE TO RELATED APPLICATIONS

This application claims priority to U.S. Provisional Application Ser. No. 63/025,230, filed May 15, 2020, the disclosure of which is hereby incorporated by reference in its entirety.

TECHNICAL FIELD

The present invention concerns additive manufacturing, and particularly concerns methods, apparatus, and systems for controlling additive manufacturing operations.

BACKGROUND

The production of three-dimensional objects from polymerizable resins by stereolithography has been known for some time (see, e.g., U.S. Pat. No. 5,236,637 to Hull). Unfortunately, such techniques have been generally considered slow, and are typically limited to resins that produce brittle or fragile objects suitable only as prototypes. A more recent technique known as continuous liquid interface production (CLIP) allows both more rapid production of objects by stereolithography (see, e.g., U.S. Pat. No. 9,205,601 to DeSimone et al.), and the production of parts with isotropic mechanical properties (see R. Janusziewcz et al., Layerless fabrication with continuous liquid interface production, Proc. Natl. Acad. Sci. USA 113, 11703-11708, Oct. 18, 2016). Along with the more recent introduction of a variety of different dual cure resins for stereolithography (see, e.g., U.S. Pat. No. 9,453,142 to Rolland et al.), these developments make possible the production of a much greater variety of functional, useful, objects suitable for real world use.

Current systems for additive manufacturing tend to be tailored towards prototyping—the making of small numbers of models that can be used to decide whether to invest in a high-volume manufacturing technique like injection molding-rather than towards the larger volume of real-world parts themselves. Accordingly, there is a need for new systems which make possible higher volume production of functional parts by additive manufacturing.

SUMMARY

Some embodiments of the invention are directed to a method of improving production performance for a batch (i.e., multiple copies) of objects being made by additive manufacturing, including: (a) providing: (i) a fleet of additive manufacturing apparatus on which said batch of said objects are produced, and (ii) a current production plan for said objects that is implemented on each individual apparatus in said fleet; (b) providing a proposed production plan for said objects; (c) randomly distributing a first and second group of print jobs for said batch of objects among said fleet of additive manufacturing apparatus, with the first group to be produced by said current production plan and comprising X percent of total print jobs, and with the second group to be produced by said proposed production plan and comprising 100-X percent of the total print jobs; (d) assigning a unique identifier to each of said objects in said first and second group of print jobs; (e) producing said objects of said first and second group on said fleet of additive manufacturing apparatus; (f) comparing a production performance of said first and second groups of print jobs based on (i) at least one predetermined performance characteristic (e.g., yield, accuracy) and (ii) the unique identifier assigned to each of said objects; and then (g) if the production performance of said second group exceeds that of said first group, producing a subsequent batch of said objects on said fleet of additive manufacturing apparatus, with a greater proportion of said objects, or all of said objects, produced by said proposed production plan than by said current production plan (as compared to steps (c) to (e)).

In some embodiments, said step (g) is carried out by: repeating steps (c) through (f) at least once (or more preferably at least twice) with X reduced, until either X is reduced to zero, or no production performance improvement for said proposed production plan is found.

In some embodiments, said proposed production plan is algorithmically generated from said current production plan.

In some embodiments, each of said objects in said first and second groups are produced free of any indicia of the group to which they belong so that said comparing step is carried out blind based on the unique identifier of each of said objects.

In some embodiments, said proposed production plan comprises a process change (e.g., light intensity, exposure time, pre-exposure delay, pump height, etc.), multiple copies of said object are produced simultaneously on each additive manufacturing apparatus in said fleet, objects produced simultaneously on each individual additive manufacturing apparatus in said fleet are in the same group (i.e., all in the first group, or all in the second group), and multiple runs of objects are produced on each individual additive manufacturing apparatus, with the objects of subsequent runs belonging to either a different group, or a randomly assigned group, as compared to the objects in a preceding run on that additive manufacturing apparatus.

In some embodiments, said proposed production plan comprises a product feature change (e.g., strut diameter for a lattice included within the object), and each individual additive manufacturing apparatus in said fleet is randomly assigned print jobs from both groups (i.e., the same machine can simultaneously be printing objects from both the first group and the second group).

In some embodiments, said producing step (e) and said comparing step (f) are both carried out until a predetermined threshold of production performance improvement is reached (e.g., a p-value less than or equal to 0.05).

In some embodiments, said fleet of additive manufacturing apparatus each produce said objects by light polymerization of a resin (e.g., by bottom up or top down stereolithography), and said resin is provided to said additive manufacturing apparatus from a plurality of separate resin lots (e.g., which lots differ from one another in photoabsorption and/or dose to cure).

Some embodiments of the invention are directed to a method of improving production performance of an additive manufacturing system includes obtaining a first production plan and a second production plan, different from the first production plan, for the manufacture of a plurality of objects using a fleet of additive manufacturing apparatus; automatically generating a first allocation of a first quantity of the plurality of objects to the fleet of additive manufacturing apparatus using the first production plan; automatically generating a second allocation of a second quantity of the plurality of objects to the fleet of additive manufacturing apparatus using the second production plan; comparing a production performance of the first and second quantity of the plurality of objects after being manufactured by the fleet of additive manufacturing apparatus; and based on the comparison of the production performance, automatically regenerating the first and second allocations to change the first and second quantities.

In some embodiments, the first quantity of the plurality of objects represents X percent of a total number of the objects in a print job, and the second quantity of the plurality of objects represents (100-X) percent of the total number of the objects in the print job.

In some embodiments, wherein comparing the production performance of the first and second quantity of the plurality of objects comprises comparing at least one predetermined performance characteristic of the plurality of objects.

In some embodiments, automatically regenerating the first and second allocations to change the first and second quantities comprises increasing the second quantity responsive to determining that the production performance of the second production plan exceeds that of the first production plan.

In some embodiments, automatically generating the first allocation of the first quantity of the plurality of objects to the fleet of additive manufacturing apparatus comprises randomly distributing production of the first quantity of the plurality of objects to individual apparatus of the fleet of additive manufacturing apparatus.

In some embodiments, the second production plan is automatically generated based on a computerized application of an algorithm to the first production plan.

In some embodiments, the second production plan comprises a process change and/or a product feature change from the first production plan.

In some embodiments, the process change comprises a change to light intensity, exposure time, pre-exposure delay, pump height, curing time, curing intensity, resin heater temperature, oxygen parameters, types of resins, resin flow, and/or resin viscosity.

In some embodiments, the product feature change comprises lattice dimensions (e.g., strut diameter), slice thickness, part scaling, lattice and/or part design.

In some embodiments, the method further includes controlling the fleet of additive manufacturing apparatus to produce the first quantity of the plurality of objects using the first production plan and to produce the second quantity of the plurality of objects using the second production plan.

In some embodiments, the method further includes obtaining one or more additional production plans for the manufacture of the plurality of objects using the fleet of additive manufacturing apparatus, automatically generating one or more additional allocations of respective quantities of the plurality of objects in addition to the first and second allocations, and comparing a production performance of the respective quantities of the plurality of objects manufactured using the one or more additional production plans to the production performance of the first and second quantity of the plurality of objects.

Some embodiments of the invention are directed to a print queuing system including a processor and a memory coupled to the processor and comprising computer readable program code that when executed by the processor causes the processor to perform operations comprising any one of the various embodiments of the methods described herein.

Some embodiments of the invention are directed to a computer program product for improving production performance of an additive manufacturing system, the computer program product comprising a non-transitory computer readable storage medium having computer readable program code embodied in the medium that when executed by at least one processor causes the at least one processor to perform operations operations comprising any one of the various embodiments of the methods described herein.

Further aspects of the present invention are explained in greater detail in the drawings herein and the specification below. The disclosures of all United States Patent references cited herein are to be incorporated herein by reference in their entirety.

DETAILED DESCRIPTION

Figure 1A:
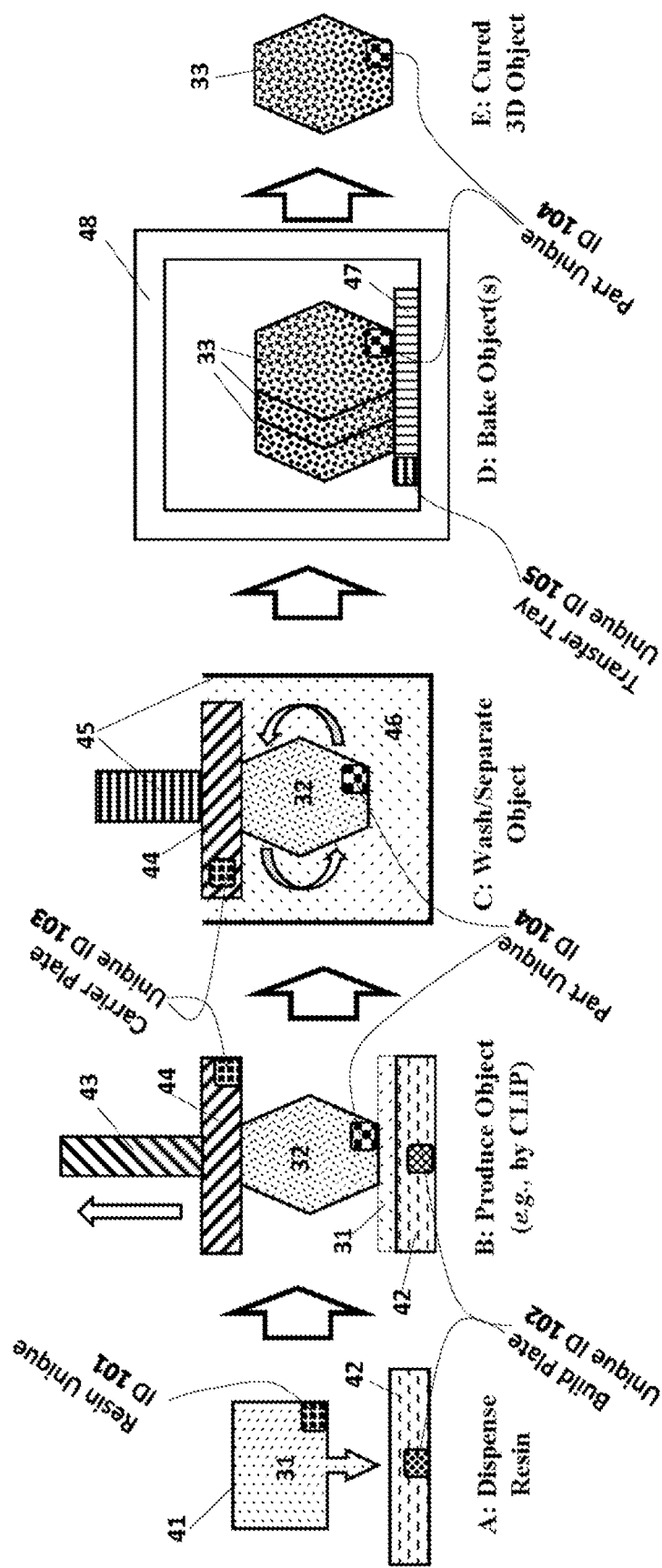
FIGS. 1A and 1B schematically illustrate embodiments of a process of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an," and "the" are intended to include plural forms as well, unless the context clearly indicates otherwise. It will be further understood that the terms "comprises" or "comprising," when used in this specification, specify the presence of stated features, integers, steps, operations, elements, components, and/or groups or combinations thereof, but do not preclude the presence or addition of one or more other features, integers, steps, operations, elements, components, and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with, and/or contacting the other element or intervening elements can also be present. In contrast, when an element is referred to as being, for example, "directly on," "directly attached" to, "directly connected" to, "directly coupled" with, or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper," and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal," and the like are used herein for the purpose of explanation only, unless specifically indicated otherwise.

It will be understood that, although the terms first, second, etc., may be used herein to describe various elements, components, regions, layers, and/or sections, these elements, components, regions, layers, and/or sections should not be limited by these terms. Rather, these terms are only used to distinguish one element, component, region, layer, and/or section, from another element, component, region, layer, and/or section. Thus, a first element, component, region, layer, or section discussed herein could be termed a second element, component, region, layer, or section without departing from the teachings of the present invention. The sequence of operations (or steps) is not limited to the order presented in the claims or figures unless specifically indicated otherwise.

1. Stereolithography Apparatus and Resins.

Resins for additive manufacturing are known and described in, for example, DeSimone et al., U.S. Pat. Nos. 9,211,678; 9,205,601; and 9,216,546. Dual cure resins for additive manufacturing are known and described in, for example, Rolland et al., U.S. Pat. Nos. 9,676,963; 9,598,606; and 9,453,142. Non-limiting examples of dual cure resins include, but are not limited to, resins for producing objects comprised of polymers such as polyurethane, polyurea, and copolymers thereof; objects comprised of epoxy; objects comprised of cyanate ester; objects comprised of silicone, etc.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

In some embodiments, the resins characterized by the methods described herein are used to carry out one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., Continuous three dimensional fabrication from immiscible liquids, PCT Patent Pub. No. WO 2015/164234, published Oct. 29, 2015; see also U.S. Pat. Nos. 10,259,171 and 10,434,706), generating oxygen as an inhibitor by electrolysis (see I. Craven et al., PCT Patent Pub. No. WO 2016/133759, published Aug. 25, 2016), and incorporating magnetically positionable particles to which the photoactivator is coupled into the polymerizable liquid (see J. Rolland, PCT Patent Pub. No. WO 2016/145182, published Sep. 15, 2016). Robeson et al. describes the use of stationary and mobile (circulating) immiscible liquids as windows for bottom-up stereolithography. Robeson et al. particularly suggests the use of circulating pools for the purposes of cooling the pool and refreshing the oxygen content of fluorinated fluid pools. Similar technology has subsequently been described by C. Mirkin et al., PCT Patent Pub. No. WO 2017/210298 (see also U.S. Patent Application Pub. No. U.S. 2019/0160733).

Other examples of methods and apparatus for carrying out particular embodiments of CLIP include, but are not limited to: Batchelder et al., U.S. Patent Application Pub. No. U.S. 2017/0129169 (May 11, 2017); Sun and Lichkus, U.S. Patent Application Pub. No. U.S. 2016/0288376 (Oct. 6, 2016); Willis et al., U.S. Patent Application Pub. No. U.S. 2015/0360419 (Dec. 17, 2015); Lin et al., U.S. Patent Application Pub. No. U.S. 2015/0331402 (Nov. 19, 2015); D. Castanon, U.S. Patent Application Pub. No. U.S. 2017/0129167 (May 11, 2017); B. Feller, U.S. Patent Application Pub. No. U.S. 2018/0243976 (published Aug. 30, 2018); M. Panzer and J. Tumbleston, U.S. Patent Application Pub. No. U.S. 2018/0126630 (published May 10, 2018); and K. Willis and B. Adzima, U.S. Patent Application Pub. No. U.S. 2018/0290374 (Oct. 11, 2018).

2. Wash Liquids.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

In some embodiments, the wash liquid can be an aqueous solution of ethoxylated alcohol, sodium citrate, tetrasodium N,N-bis(carboxymethyl)-L-glutamate, sodium carbonate, citric acid, and isothiazolinone mixture. One particular example thereof is SIMPLE GREEN® all purpose cleaner (Sunshine Makers Inc., Huntington Beach, Calif., USA), used per se or mixed with additional water.

In some embodiments, the wash liquid can be an aqueous solution comprised of 2-butoxyethanol, sodium metasilicate, and sodium hydroxide. One particular example thereof is PURPLE POWER™ degreaser/cleaner (Aiken Chemical Co., Greenville, S.C., USA), used per se or mixed with additional water.

In some embodiments, the wash liquid can be ethyl lactate, alone or with a co-solvent. One particular example thereof is BIO-SOLV™ solvent replacement (Bio Brands LLC, Cinnaminson, N.J., USA), used per se or mixed with water.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.

Examples of hydrochlorofluorocarbon solvents that may be used to carry out the present invention include, but are not limited to, 3,3-Dichloro-1,1,1,2,2-pentafluoropropane, 1,3-Dichloro-1,1,2,2,3-pentafluoropropane, 1,1-Dichloro-1-fluoroethane, etc., including mixtures thereof.

Examples of hydrofluorether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M), Novec 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

In some embodiments, the wash liquid comprises an azeotropic mixture comprising, consisting of, or consisting essentially of a first organic solvent (e.g., a hydrofluorocarbon solvent, a hydrochlorofluorocarbon solvent, a hydrofluorether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, tert-butanol, etc.; e.g., in an amount of from 1 to 15 or 20 percent by weight). Additional ingredients such as surfactants or chelants may optionally be included. In some embodiments, the azeotropic wash liquid may provide superior cleaning properties, and/or enhanced recyclability, of the wash liquid. Additional examples of suitable azeotropic wash liquids include, but are not limited to, those set forth in U.S. Pat. Nos. 6,008,179; 6,426,327; 6,753,304; 6,288,018; 6,646,020; 6,699,829; 5,824,634; 5,196,137; 6,689,734; and 5,773,403, the disclosures of which are incorporated by reference herein in their entirety.

3. Wash Methods and Apparatus.

Apparatus for washing parts produced by additive manufacturing are known, and can be modified for use in the present invention in accordance with known techniques. (See, e.g., U.S. Pat. Nos. 5,248,456; 5,482,659, 6,660,208; 6,996,245; and 8,529,703). However, many such part washers are not adapted to cleaning larger numbers of more diverse parts having much more diverse material properties. Hence, overall wash speed is preferably accelerated by employing higher volume liquid exchange pumps, and/or pneumatic liquid exchange, rapid draining of fluids such as by gravity-assist, more aggressive agitation, such as by spinning the objects to be cleaned in the wash liquid (e.g., while still mounted on the carrier plate on which they were produced), by including "dry" steps, such as by draining the wash liquid and spinning the object in air to centrifugally remove residual resin and wash liquid from the object, optionally by re-immersing the object in the wash liquid and repeating the wash program, etc. Additional agitation sources, such as ultrasonic agitation, can also be provided.

4. Partial Removal of Surface Resin.

After the intermediate object is formed by additive manufacturing, resin on the surface thereof is partially removed such that residual resin is retained as a coating film on the surface, in unpolymerized (e.g., viscous liquid) form. In some embodiments, rather than using a wash liquid during a wash step, excess resin from the intermediate object may be separated from the object during a separating step. The excess resin may, in some embodiments, be collected and reused.

The separating step can be carried out by any suitable means, such as by centrifugal separation, gravity drainage, wiping (e.g. with a compressed gas) or a combination thereof. Centrifugal separation in an enclosed chamber is currently preferred, where the collected excess resin can be drained, continuously or in a batch-wise fashion, from the enclosed chamber. When centrifugal separation is employed, the objects can be retained on their build platforms and those build platforms mounted on a rotor for spinning; the objects removed from their build platforms and placed in a basket for spinning, the objects can be removed from their build platforms and secured to retention members (such as skewers for pre-formed retention openings intentionally included in the objects), etc. In some embodiments, the interior of the centrifugal separating apparatus is coated with a non-stick material, such as described by Aizenberg et al. in U.S. Pat. Application Pub. 2015/0209198 A1, the disclosure of which is incorporated by reference herein. Methods and apparatus for separating excess resin from additively manufactured objects are described in PCT Application No. PCT/US2019/053188, filed on Sep. 26, 2019, entitled "SPIN CLEANING METHOD AND APPARATUS FOR ADDITIVE MANUFACTURING," the entire contents of which are incorporated herein by reference.

In some embodiments, the devices performing centrifugal separation may include sensors tracking information such as spinning speed or spin time. The sensors may be operatively associated with the systems described herein.

5. Further Curing (Baking) Methods and Apparatus.

After washing/separating the intermediate object (e.g., by separating the excess liquid from the object using a centrifugal spinner), further curing on the intermediate object may be performed. Further curing of the parts can be carried out by any suitable technique, but is typically carried out by heating that may include active heating (e.g., in an oven, such as an electric, gas, solar oven or microwave oven, or combination thereof). Ovens may be batch or continuous (conveyor) ovens, as is known in the art.

Conveyor ovens are in some embodiments preferred, including multi-zone conveyor ovens and multi-heat source conveyor ovens, and associated carriers for objects that can serve to provide more uniform or regular heat to the object being cured. The design of conveyor heating ovens, and associated controls, are well known in the art. See, e.g., U.S. Pat. Nos. 4,951,648; 5,179,265; 5,197,375; and 6,799,712.

In some embodiments, the heating (baking) step or program is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate object may be heated in a stepwise manner at a first temperature of about 70° C. to about 150° C., and then at a second temperature of about 150° C. to 200 or 250° C., with the duration of each heating depending on the resin chemistry, size, shape, and/or thickness of the intermediate. In another embodiment, the intermediate may be cured by a ramped heating schedule, with the temperature ramped from ambient temperature through a temperature of about 70 to about 150° C., and up to a final (oven) temperature of about 250 or about 300° C., at a change in heating rate of 0.5° C. per minute, to 5° C. per minute. (See, e.g., U.S. Pat. No. 4,785,075).

In some embodiments, the oven may include a carousel or rotisserie for the objects, and/or a convection element, to facilitate uniform heating.

In some embodiments, the oven may include a light source, such as an ultraviolet light source, to further light cure components therein, during the heat curing stage.

In some embodiments, the oven may include a gas source configured to purge the oven with an inert gas (e.g., nitrogen, argon) during baking of objects therein (to achieve depletion of ambient oxygen during baking of parts) at an atmospheric, elevated, or reduced pressure level; in other embodiments, the oven may include a gas source (e.g., compressed oxygen; an oxygen generator or concentrator) configured to enrich the atmosphere in the oven with oxygen during baking of objects therein; in still other embodiments, the oven may include both of the aforesaid gas sources. The choice of gas source and/or gas pressure, to achieve either oxygen depletion or oxygen enrichment during baking, may depend upon the particular resin from which the objects are produced.

In some embodiments, the oven may include sensors such as temperature and/or pressure sensors from which data may be collected. The sensors may be operatively associated with the systems described herein.

Ovens will generally include a vent duct, connected to a venting system. In some embodiments, the vent includes a sensor or detector for detecting one or more vapors that are "out-gassed" from the objects being baked therein, such as solvents and/or diluents. The detector may be operatively associated with the systems described herein to provide data characterizing the objects, or provide an indication of when baking is complete (which may automatically stop the bake cycle). In addition, the vent may include a build-up or "choke" detector, to alert the user when the vent or vent system has an undesirable level of deposits thereon.

6. Additional Peripheral Machines.

In addition to part washing and/or separating machines, other peripheral machines may also be used. For example, pre-production machines, including resin dispenser and/or blending machines (as separately noted) when not a component of the additive manufacturing machine itself, may be included. In some embodiments, the resin dispenser and/or blending machines may be mobile resin dispenser and/or blending machines delivering resins to a fleet of additive manufacturing machines on demand.

Other pre-production machines, or maintenance machines, may also be included in the systems described herein. For example, when an interchangeable build plate (window or "cassette") is used, periodic cleaning thereof may be performed (e.g., by immersing in and/or scrubbing with a suitable solvent, such as isopropanol, or the wash liquids as described above). Such machines may be implemented and automated in like manner as the part washing and/or separating machines described herein (or in some cases the part washing machine can also serve as a cassette cleaning machine).

Additional examples of post-production machines that can be incorporated as peripheral apparatus in the systems and methods described herein include, but are not limited to, part penetrant bath apparatus (e.g., for impregnating an additional polymerizable component into a part after additive manufacturing, but before further or subsequent cure), part cutting, grinding, and/or finishing machines (e.g., bead blasting, milling, tumbling, painting, etc.).

7. Unique Identifiers and Readers.

"Unique identifier" and "unique identifier reader" as used herein refer to components of an automatic identification and data capture system. Suitable unique identifiers include, but are not limited to, bar codes (including one-dimensional and two-dimensional bar codes), near field communication (NFC) tags, radio frequency identification (RFID) tags (including active, passive, and battery-assisted passive RFID tags), optical character recognition (OCR) tags and readers, magnetic strips and readers, etc. A variety of such systems are known and described in, for example, U.S. Pat. Nos. 8,120,468; 8,526,910; 9,373,201; 9,562,429; 9,576,476; 9,587,487; 9,589,428; and 9,595,058. Unique identifiers and their corresponding readers of various different types can be utilized at various points in the integrated system described herein, as discussed further below.

8. Integrated Systems.

Methods and apparatus for additively manufacturing a three-dimensional object such as those described herein may be integrated and controlled from a centralized control system. As used herein, an integrated system may include the ability to programmatically control operations of the apparatus and send and/or receive data related to the operation of the apparatus. Non-limiting examples of integrated systems and methods encompassed by the present invention are illustrated in the figures.

Figure 1B:
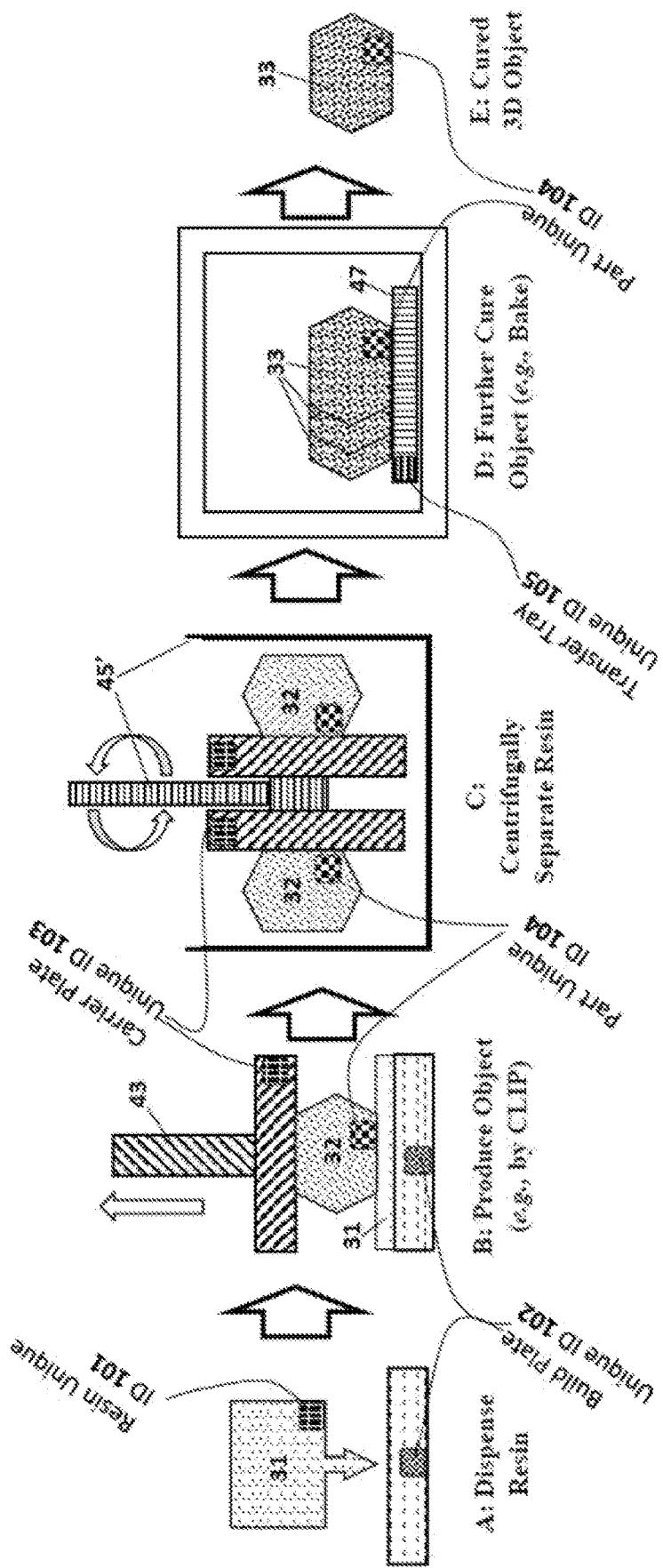

FIGS. 1A and 1B illustrate an integrated system incorporating multiple apparatus for additive manufacturing according to some embodiments described herein. The multiple apparatus may include various apparatus described herein, such as apparatus for additive manufacturing (e.g., a CLIP system), washing/separating, and/or curing/baking. As shown in FIG. 1A, it will be appreciated that different unique identifiers (101, 102, 103, 104) can be used at different points in the systems and methods described herein. For example, an NFC tag, RFID tag, and/or bar code (101) may be most appropriate for placing on or associating with the resin container when the resin is manufactured, with the associated reader operatively associated with a resin dispenser or supply (41) system into which the resin (31) will be loaded by the resin user. The resin manufacturer can optionally utilize an associated reader, when the resin is manufactured, to generate a record of the resin type, batch ingredient data, and/or manufacturer identity.

Similarly, where resin is dispensed into a movable build plate (42) (sometimes also referred to as a "window," "cassette," or "platform") that is then transferred with the resin to an additive manufacturing machine, then an NFC tag, RFID tag, and/or bar code (102) might be most appropriate to associate with that build plate or cassette, with the associated reader at the resin dispenser (41) and/or at the additive manufacturing machine (43) configured to capture the build plate identity, and associate it with the resin data, in a database. Resin data may include, for example, resin type data (non-limiting example of which include rigid polyurethane, flexible polyurethane, elastomeric polyurethane, cyanate ester, epoxy, silicone, and/or urethane methacrylate) and resin batch data (non-limiting examples of which include date of manufacture, ingredient data, and/or manufacturer identity), optionally supplemented with resin dispense data (non-limiting examples of which include date and time of dispense, dispense speed, dispense volume, and/or cassette ID).

When parts or objects (32) are additively manufactured on a removable carrier plate (44), the carrier plate may have its own appropriate unique identifier (103), such as an NFC tag, RFID tag, and/or bar code, with appropriate reader on the additive manufacturing machine (43) and a washing/separation machine (45), to record additive production data.

Each part (32) produced on an additive manufacturing machine can also have its own unique identifier (104) (for example, a set of alphanumeric characters and/or symbols appearing on a surface or other location thereof), which can be imparted by any suitable technique, including, in the apparatus controller, a routine for modifying each product geometry data file just before and/or during part production, and recording the unique identifier in association with that part (along with, for example, other resin and part production data. In some embodiments, modifying the product geometry data file may include incorporating the unique identifier into the product geometry data file so that the unique identifier is structurally incorporated in the manufactured part. Methods of incorporating the unique identifier into the product geometry data and associating the unique identifier with the manufactured object are discussed, for example, in PCT Application No. PCT/US2018/021922 filed on Mar. 12, 2018, entitled "INTEGRATED ADDITIVE MANUFACTURING SYSTEMS INCORPORATING IDENTIFICATION STRUCTURES," the entire contents of which are included by reference herein.

As noted previously, washing and/or separation machines may be configured to execute a variety of different washing and/or separation programs (as may best suit objects and/or parts made in particular configurations and/or from particular resins). In FIG. 1A, a part washing machine (45) may immerse the manufactured part in a washing liquid. FIG. 1B illustrates an embodiment of the process in which a separation machine (45') is utilized, according to some embodiments of the present invention. In some embodiments, the separating machine may be a centrifugal separation machine (45'), also known as a "spinner." When the part is to be washed/separated on the carrier platform on which it was produced (as shown in FIG. 1B), the separation machine (45') can include an appropriate unique identifier reader for recording the part being operated upon, and also recording separation data for that particular part. If the separating program is not pre-set (as may be the case for higher volume through-put of similar parts), then the separation machine (45') can be configured to select the appropriate separation program for each part, based on information in the database on part configuration and/or resin type.

In some embodiments, the separation machine (45') can dynamically determine the appropriate separation program for a part based on reading the unique identifier associated with that part. The appropriate separation program may be based on the part geometry, part materials, and/or other information retrieved using the unique identifier. In some embodiments, the separation machine (45') may be configured to dynamically switch from a first separation program for a first part to a second separation program for a second part based on respective first and second unique identifiers associated with the first and second parts. As used herein, dynamically switching a separation program means that characteristics of a separation program (e.g., intensity, speed, and/or duration) used by a separation machine may be modified without additional intervention by an operator and/or programming based, in part, on a unique identifier associated with the part being operated upon. In some embodiments, the separation program being utilized by the separation machine (45') for a part may be determined at the time that a unique identifier associated with the part is read by the appropriate identifier reader and compared to a database containing separation information for the given part.

In like manner, ovens (48) may be configured to execute a variety of different bake programs (again as may best suit objects made in particular configurations and/or from particular resins). Here, the part may be removed from its carrier platform (particularly if the NFC tag is not heat resistant), but can be moved on a transfer table to a transfer tray (47), where the transfer tray includes a more heat-stable unique identifier (such as a bar code) (105), and the transfer table includes a reader for both the carrier plate and the transfer tray (to associate in the database the particular part with a particular tray), and the oven (48) can include a reader and/or scanner for the transfer tray unique identifier (to associate, in the database, oven data with each particular tray, and hence to each particular part). Of course, multiple parts may be included on each tray, and other formats can be employed. For example, a sacrificial unique identifier (such as an NFC tag) can be fastened to or associated with the part as it enters the oven, and although destroyed during the bake program, can still be utilized to associate in the database the particular part with a particular oven, bake program, and operator, or other cure step information (non-limiting examples include time since production and/or separation, machine identity, cure program, operator identity, time and day of cure).

As with the separation machine, the oven may be configured to execute a variety of different cure (particularly bake) program options. If the bake program is not pre-set (as may again be the case for higher volume through-put of similar parts), then the oven can be configured to select the appropriate bake program for each part, based on information in the database on part configuration and/or resin type. In some embodiments, as discussed herein with the separation machine, the appropriate bake program for a part may be dynamically selected at the time of baking based on the unique identifier associated with the part that is read or otherwise accessed by the oven. In some embodiments, the oven may be configured to switch between a first set of curing options for the oven and a second set of curing options based the unique identifier associated with a given part.

In some embodiments, when preparing a part for curing, one or more parts may be selected for simultaneous curing based, in part, on the unique identifier for the respective parts. For example, when transferring parts from a carrier platform to a transfer tray, it may be determined, based on the unique identifiers for the parts, that one or more parts share a curing configuration. In such a circumstance, the parts sharing the curing configuration may be combined, such as by including the parts on a same transfer tray or loading the parts separately into the oven at a same time, so that they may be cured simultaneously. In some embodiments, for example, when curing follows washing and/or separation, a system controller may identify parts which share curing configurations during a washing and/or separation step (or other step which precedes curing) and may proactively schedule simultaneous curing for one or more parts. In some embodiments, an order in which parts are cured may not match an order in which parts are washed, separated, and/or manufactured, as parts are moved ahead or behind in order to combine parts for curing. Such a combination of parts may allow the manufacturing process to dynamically schedule curing so as to more efficiently utilize curing equipment by combining parts which cure for a similar amount of time at a similar temperature.

Where parts have a unique identifier formed thereon, such as an alphanumeric and/or symbol indicator as noted above, washers, ovens, and/or other peripheral machines can include a camera operable to record the identifier from a particular part, responsive to which data associated with the washers, ovens, and/or other peripheral machines can be added to the database, in addition to or as an alternative to some of the options for unique identifiers described above. In some embodiments, the unique identifier may be formed on a portion of the part that is removed by a support removal station. In some embodiments, the unique identifier may be formed on a portion of the part that remains after manufacturing. In some embodiments, the unique identifier may include a combination of segments, some of which are removed by the support removal station and some of which remain on the part after manufacturing.

After curing, the final 3D object (33) may be complete, though, in some embodiments additional operations (e.g., support removal, post-processing, etc.) may be performed after the curing step. By using the integrated system illustrated in FIGS. 1A and 1B, as well as the unique identifiers (101, 102, 103, 104, 105) associated with the products and processes of the integrated system, a "digital thread" may be created which allows for digital record(s) that trace the processes performed on the manufactured object (33) as well as data related to the materials used in those processes.

Data collected within the integrated manufacturing system may include a rich collection of information associated with the various devices and processes being utilized. For example, sensors may provide environmental variables associated with the environment including temperature, lamp lux and UV values associated with the manufacturing devices, and humidity. As another example, sensors associated with the mixing devices may automatically retrieve and/or store data related to a mix ID, resin identification, mix time, resin properties, and the mix ratio being utilized. As another example, sensors associated with the printing devices may automatically retrieve and/or store data related to the mix ID being used. As another example, sensors associated with the separation devices may automatically retrieve and/or store data related to a spin ID, a separation platform serial number, the spin time, and/or the spin speed. As another example, sensors associated with part removal devices may automatically retrieve and/or store data related to a part removal ID, a platform serial number, and/or a baking sheet/tray serial number. As another example, sensors associated with oven devices may automatically retrieve and/or store data related to baking tray IDs and positions, a bake time, a purge time, nitrogen volume of the bake, and/or a time series of temperature values at particular locations in or around the oven.

9. Process Improvement.

As described herein, the process of additive manufacturing can be arranged such that the processing of a particular additively manufactured part can be automatically tracked from start to finish, with records kept of the materials used to manufacture the part, and configuration of individual steps in the additive manufacturing of the part determined and set based, in part, on automatic identification of the part as it moves through the process using, for example, unique identification numbers.

When producing batches of objects on a fleet of additive manufacturing apparatus, continual optimization of the process leads to higher yields. Unfortunately, testing for small (e.g. less than 1%) improvements can require thousands of data points, and becomes a time consuming and expensive logistics problem.

Figure 2:
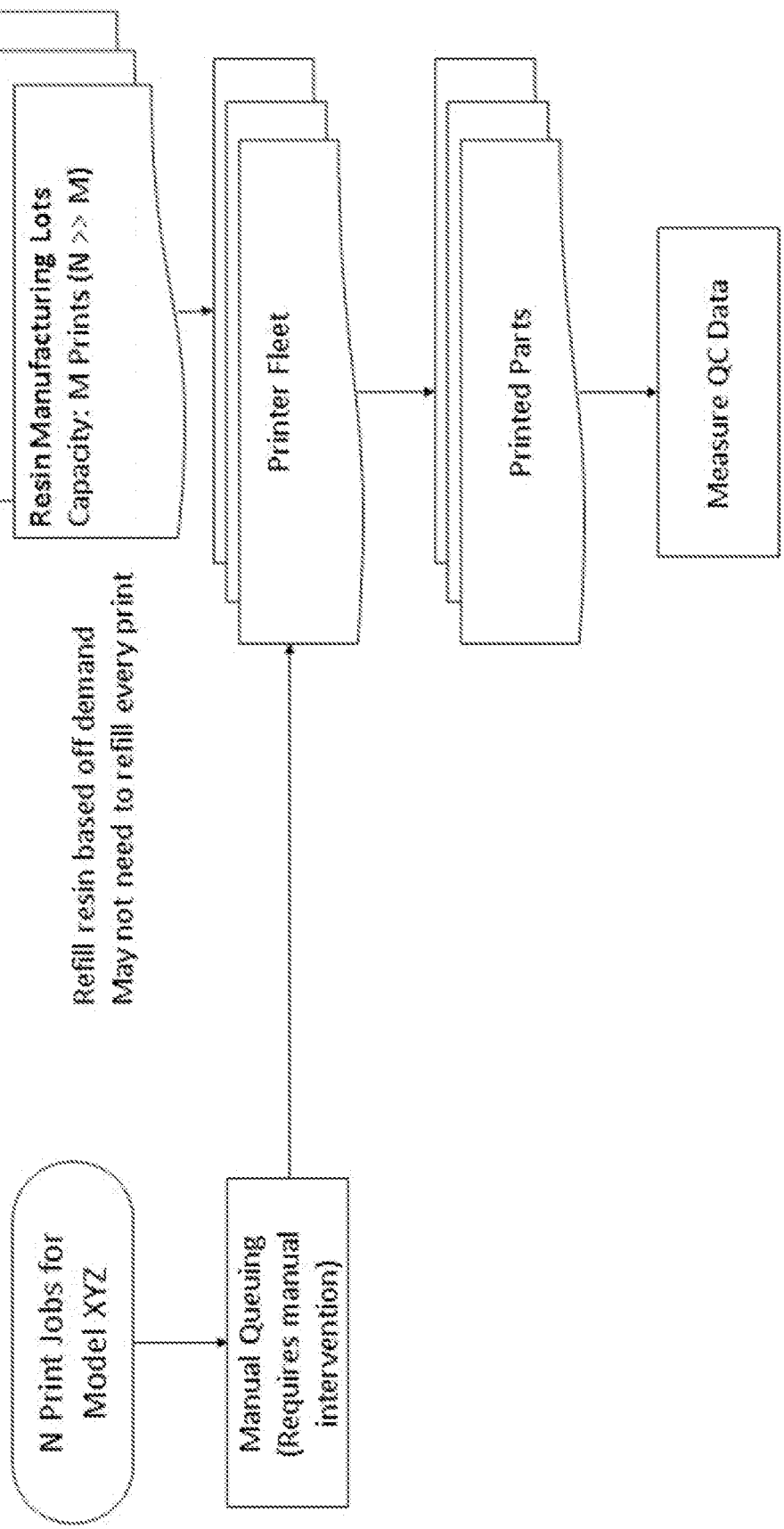
FIG. 2 illustrates an infrastructure for an integrated manufacturing system, according to some embodiments of the present invention.

Current methods for testing new print strategies involve manual queuing of the proposed strategy, as shown in FIG. 2. Referring to FIG. 2, a particular model of part (e.g., "Model XYZ") may be selected to test a potential improvement to the manufacturing process. For example, it may be desirable to change some portion of the additive manufacturing configuration for the model to determine if the modification results in a higher-quality product. The change may be incorporated into the configuration, which may be used to generate a print job including a number (e.g., N) of objects to be manufactured that include the modification. Incorporating the modification may utilize the queuing of the new print job onto a fleet of printers (also referred to herein as additive manufacturing apparatus and/or machines).

This may involve selecting some number of available printers (e.g., additive manufacturing machines). The selection process may be a manual queuing process in which particular printers are selected from a number of available printers in the printer fleet. This selection process may be subject to hardware variability. That is to say that different printers may have different physical characteristics that vary their output slightly, though the variance may be within a particular tolerance for the printer. Thus, the selection of the printers to perform the modification may impact the result, as the hardware variability of the printers selected may reflect in the final manufactured product. Examples of characteristics that may differ among printers includes cassette/printer wear (e.g., oxygen issues, cleanliness, light engine degradation), inherent variation in light engine (e.g., wavelength, contrast, focus), operators may be split by printer, differences in machine placement (e.g. under an AC vent, different oxygen supply), etc.

Resins may be input into the printers for manufacturing of the modified parts. The resins may also be subject to variation. For example, resins are typically produced in manufacturing lots. The manufacturing process for the resins may also be subject to process variability. The resins manufactured in a particular manufacturing lot may have characteristics that differ (albeit within tolerances) from resins manufactured in other manufacturing lots. Examples of characteristics that may differ among resins include day-to-day variation in resin lots, differences in resin based on a location (e.g., top vs. bottom) in a storage container, resin differences between the beginning/end of processing, etc.

The capacity of the resin provided to a particular printer may be some level M, where M is less than N. That is to say that the number of prints used for the print job of the modified parts (e.g., N) may be larger than the number of objects that may be printed by an amount of resin in a particular batch (e.g., M). Thus, the resin provided to a particular printer that is performing the print job of the additively manufacture part containing a modification may need to be changed during the manufacturing process. Due to the potential for process variability within the resin, this change may mean that a first portion of the manufactured parts are printed with a resin having a first characteristic and a second portion of the manufactured parts are printed with a second resin having a second characteristics.

Other variations that can affect the final manufactured product include operators that may clean/process differently, night-shift/day-shift operators, one subset of machines vs. another, oven bakes are not identical (e.g., day-to-day changes in facilities), temperature/humidity impacting cleaning/baking/printing/testing, machines drifting over time as parts wear out, etc. The provided list is merely an example, and it will be understood that other factors may affect the production of additively manufactured parts.

Once printed, the parts may be analyzed to measure quality control (QC) data. In other words, the printed parts may be analyzed to determine whether the modification resulted in a product that is improved with respect to previous versions of the product.

Unfortunately, the various methods of modifying an additive manufacturing process using manual queuing described herein may have associated problems, as summarized in Table 1.

TABLE 1

Different Methods of Manual Queueing

| | |
|---|---|
| Queue all A, then all B | No immunity to resin process variability |
| Alternate A and B at a predefined ratio | May create periodic bias |

TABLE 1-continued

Different Methods of Manual Queueing

| | |
|---|---|
| Queue half printers with A, then the other half with B | Data may be biased towards specific machines<br>No immunity to resin/process variability |
| Mix and match the above | Time consuming, requires someone to design and queue |

Table 1 illustrates some problems that may be associated with trying to manually schedule a variation in production of an additively manufactured part (listed as part "B") to compare with another additively manufactured part (listed as part "A"), which may be an existing or "legacy" configuration for the part.

As illustrated above, one method of selecting printers to print the "new" part B, may include queuing the printing of a run of "A" parts followed by a run of "B" parts. This can introduce issues related to variability in the resin used, since the majority of "A" parts may be done on one batch of resin while the majority of "B" parts may be done on another batch of resin.

Another method may involve alternating the printing of the "A" and "B" parts at particular intervals. While this may allow for "A" and "B" parts to be manufactured from a same batch of resin, the alternation is likely to be done at predictable intervals, which can be subject to periodic bias, since the regular timing of the switching may occur at specific times, making the manufacturing subject to variations in manufacturing (e.g., the particular operation, operating environment, etc.) that might be associated with those particular times.

Another method may involve printing "A" parts on a first set of printers and "B" parts of a second set of printers. This not only has similar vulnerabilities with respect to resin variation discussed above, but may also introduce variations associated with differences in the printers themselves.

Another method may involve queuing based on a combination of two or more of the methods described above. However, such a combination may still be vulnerable to the particular process variations discussed above, and the combination itself may be complicated, requiring a lengthy design that may be subject to other types of selection biases.

Though the discussion with respect to FIG. 2 focused mostly on variations associated with printers, it will be understood that similar variations may be present with other machines associated with the additive manufacturing process, such as washing/spinning devices (and associated liquids) as well as baking/curing devices.

Therefore, comparable methods that attempt to test variations in processing steps for additive manufacturing systems, including those that involve manual queueing steps, may be subject to a number of inherent issues that make it difficult to accurately determine if the variation resulted in an improved product. Accordingly, it would be extremely useful to have methods and apparatus that, when potentially improved print strategies are introduced, place validation of those strategies in the hands of the printer fleet manager. This could, for example, allow manufacturers to monitor results with the new strategy and gradually increase the percentage of objects made by the new print strategy until they have gained sufficient confidence to switch entirely to the new print strategy.

Figure 3:
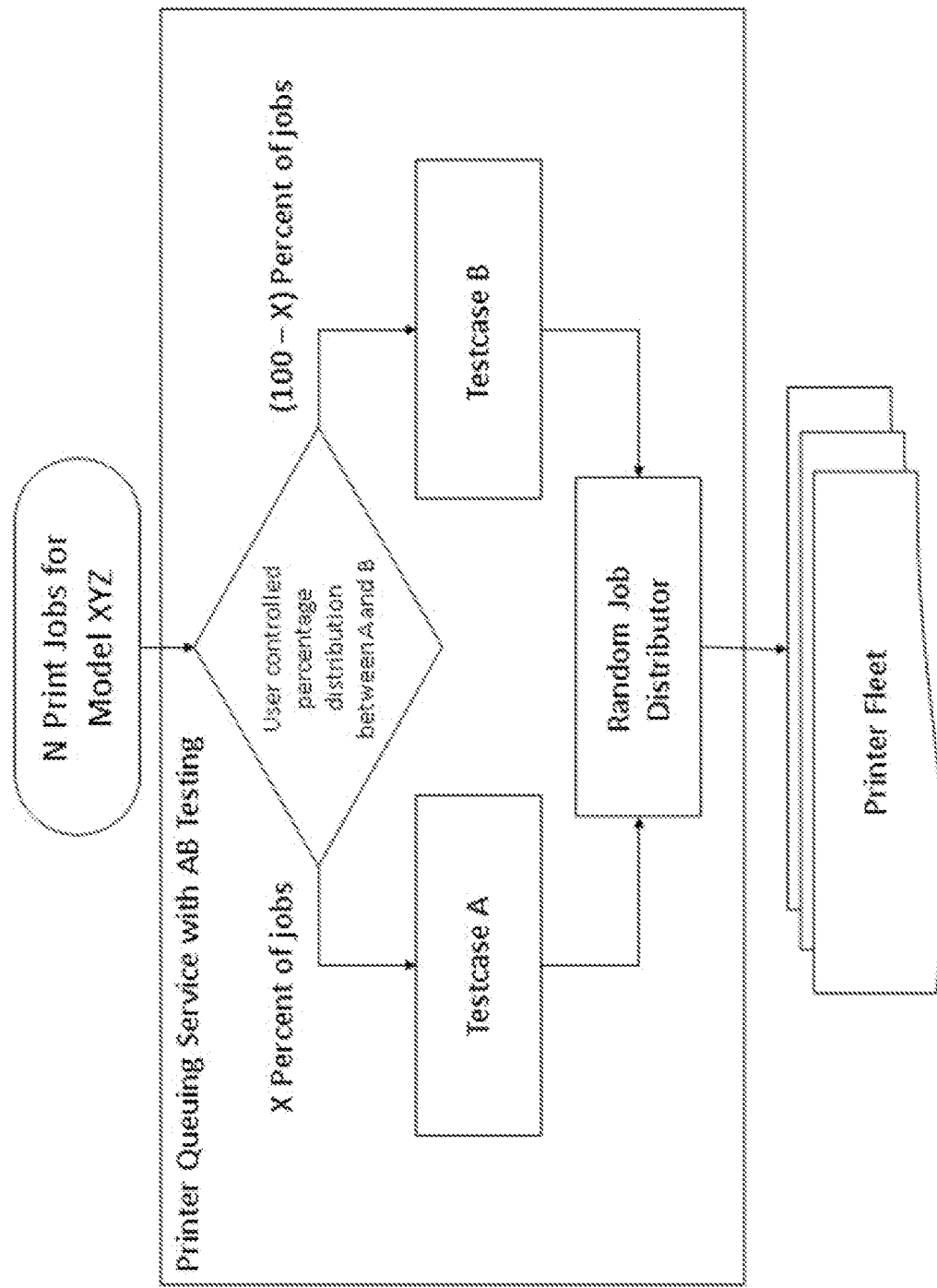
FIG. 3 illustrates an improved printer queuing service according to some embodiments of the present invention.

An overview of an improved system according to the present invention is given in FIG. 3.

Referring to FIG. 3, an improved system according to embodiments described herein allows the manufacturer to slowly alter the percent (illustrated as X in FIG. 3) of new and old print strategies, monitor results, and if positive, decrease X until the production line is cut over to the new process.

For example, utilizing a similar example as discussed with respect to FIG. 2, N print jobs may be defined for a particular part model, illustrated as "Model XYZ" in FIG. 3. The process may begin with the user (which may be a user of the manufacturing process, but the embodiments described herein are not limited thereto) selecting a particular percentage of allocation of "B" parts (which may be parts having a particular modification to be analyzed) and "A" parts, which may not have the same modification as the "B" parts. For example, the user may select that X % (e.g., 90%, or 98%, or other percentage less than 100%) of the manufactured parts are to be "A" parts and the rest are to be "B" parts. A printer queuing service may be used that allocates the N print jobs such that X % of the N print jobs are configured to be manufactured according to the characteristics associated with the "A" part, while (100-X) % of the N print jobs are configured to be manufactured according to the characteristics associated with the "B" part. For example, if X is 90%, the N print jobs may be allocated such that 0.9N parts are manufactured as "A" parts and 0.1N parts are manufactured as "B" parts.

The printer queuing service may then randomize the distribution of the "A" parts and "B" parts across the printer fleet. In this way, a controlled number of the parts will incorporate the change to be analyzed (e.g., the "B" parts) while the rest of the parts may be incorporated using the "A" parts. The distribution of the "A" parts and the "B" parts may be described herein as an "AB distribution."

Figure 4:
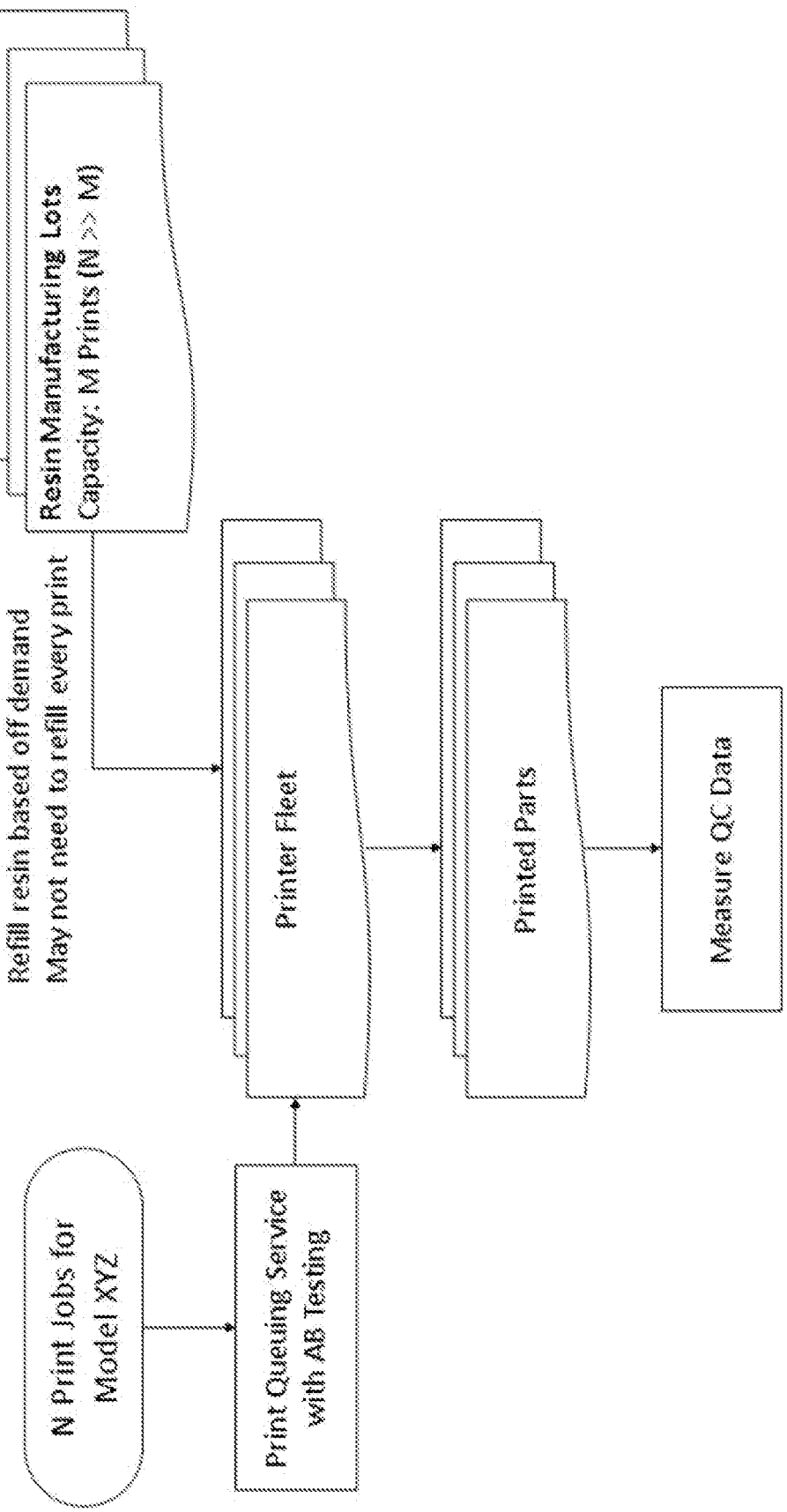
FIG. 4 illustrates an improved system for improving production performance of an additive manufacturing system according to some embodiments of the present invention.

Such a service is particularly advantageous for a system as illustrated in FIG. 4, where multiple lots of resin (which may differ from one another in parameters such as photoabsorption and dose-to-cure) are required to produce the number of objects needed. In FIG. 4, the manual queuing illustrated, for example, in FIG. 2 is replaced with a print queuing service that is configured to distribute (e.g., randomly) print jobs that are associated with particular configurations of a part across the printer fleet.

When N (the number of parts to be made) is substantially greater than M (the number of parts that can be manufactured with a particular manufacturing lot and/or container of resin), and with random AB testing distribution, the measured QC data is more insulated from process variability (e.g., upstream, at the resin manufacturer or during resin storage prior to object production, or elsewhere), as well as printer specific performance issues.

Figure 5:
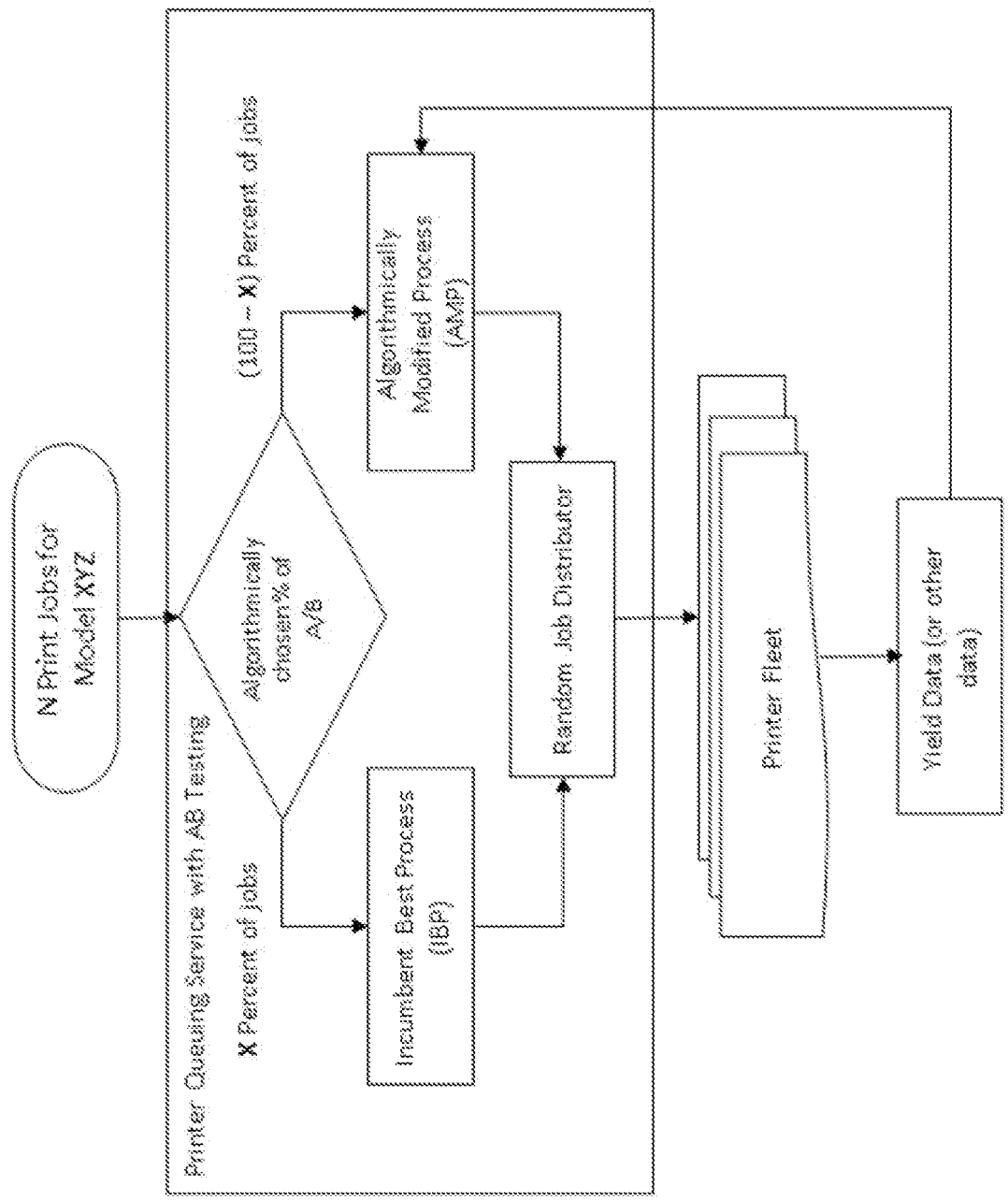
FIG. 5 illustrates an improved printer queuing service according to some embodiments of the present invention.

In a particular embodiment, the new process can be algorithmically generated from an incumbent best process (IBP), as shown in FIG. 5, to facilitate automatic optimization of a process over time.

Referring to FIG. 5, a modification to an existing part may be analyzed by incrementally integrating the modification into the existing process. The process to manufacture the existing part (illustrated as the IBP), e.g., an "A" part, may be allocated to X percent of the jobs. The modified part, e.g., a "B" part, may be allocated to 100-X percent of the jobs.

In some embodiments, the allocation X may be algorithmically chosen. For example, the user may specify an initial allocation, or a range of allocations, and the printer queuing service may select an allocation from within the range. For example, the user may indicate that the modified part may be allocated to from 1 to 10 percent of the parts. The printer queuing service may select the initial allocation from within the range based on, for example, the size of the print job, the number of printers available, the amount of resin needed to print the part, etc.

Once the allocations between the two types of parts are selected, the jobs may be distributed across printer fleet. In some embodiments, the distribution may be completely random. In some embodiments, a distribution may be selected such that approximately equal numbers of the two types of parts are selected for each printer (or type of printer) in the printer fleet, and the order of the jobs are then randomized on the particular printers. Such a balanced approach may be useful if testing, for example, different blocks of printers with different resin, different manufacturing facilities, different models/ages of printers. etc.

In some embodiments, the distribution of the products may be hidden from the operators of the devices. For example, the parts may be produced free of any indicator that would provide information as to which process was being used to manufacture the part. This may avoid biasing the operators and/or QC personal for or against a particular process variation. The print queuing service may maintain, for example, data that correlates particular unique identifiers of manufactured parts to the process that was used to manufacture the part.

Once the parts are manufactured, they may be put through a QC process. The QC process may determine whether the manufacturing parts are within the defined parameters for the final device. The QC process may have access to information that indicates which process (e.g., "A" or "B") was used to manufacture the part. For example, data from the manufacturing process, include the unique identifier for the part, may be maintained that connects the part being manufactured to the particular process that was used. In some embodiments, the yield of the "A" process vs. the "B" process may be compared. As used herein, the "yield" may refer to the amount of products that are within acceptable range for particular characteristics of the manufactured part (i.e., objective standards that determine whether the part is acceptable). By comparing, for example, the yield of "A" parts vs. "B" parts, it can be determined if the modification to the process results in an improvement. Other characteristics of the additively manufactured parts that may be analyzed include part stiffness, material properties, dimensions, color, print failure mode, etc.

Whether or not a product is within acceptable parameters may be a binary comparison (e.g., pass/fail), but the embodiments described herein are not limited to those types of comparisons. In some embodiments, parameters of the product may be analyzed that provide a comparison of "better or worse" instead of just pass/fail. For example, the stiffness of a part (e.g. shoe, helmet pad, cushion . . . ) may be analyzed against preferred parameters to compare the products. In some embodiments, a weighted scoring system may be used to compare the products. For example, if stiffness is being analyzed, some products may be considered better if they are "stiffer," within a particular range. A finished product for such a characteristic may be given a higher score if it is stiffer (within the acceptable range) as compared to a product that was less stiff. The stiffness of the product may be given a weight in terms of the overall importance of stiffness to the ultimate product In some embodiments, the score may be based on how close to a particular target (e.g., an ideal characteristic) the characteristic of the product is. Such a comparison may achieve the goal of reducing variability in the manufactured process. In some embodiments, scores from a plurality of characteristics may be combined (in some embodiments, based on a weight of the characteristic) to generate a combined score for the part.

Once the QC characteristics for the various products have been determined (e.g., yield and/or scored performance), the process may use a feedback loop to alter the allocation of the parts. For example, if the "new" (e.g., "B") parts are performing favorably, the allocation of the modified parts may be increased. Such a process may allow for the "new" part to eventually become the IBP. In some embodiments, changes to the process allocation may not be made until a predetermined threshold of production performance improvement is reached (e.g., a p-value less than or equal to 0.05). Thus, in some embodiments, multiple runs (e.g., multiple print jobs) may be repeated before the allocation of the parts is adjusted.

In some embodiments, the modification that is applied to the part may also be algorithmically determined. For example, a user may input a range of a variable and/or characteristic to be modified, and an initial value in that range may be selected. After an initial manufacturing process, the QC data may be used to modify the variable and/or characteristic being changed. For example, if the QC results are favorable, the modification of the variable may be increased (e.g., more change) within the range of variables provided by the user. If the QC results are not favorable, other, perhaps less aggressive, variations may be selected. In some embodiments, the process may initially pick a lowest change to the variable within the range as an initial value and may increase the change to the variable within the range until the QC results begin to be negative or less positive than prior runs.

In some embodiments, rather than being specified by a user, the change to the process may be algorithmically determined based on perturbations made to existing processes. For example, small changes may be automatically made to one or more characteristics of a part production process. The change may be tracked against recorded yield data so as to dynamically "learn" improvements to the manufacturing process.

In some embodiments, the "modification" that is tested may be a number of elements. For example, the modification may include changes to the makeup of the part, changes to the configuration of the machines used to make/wash/cure the part, changes to the materials used in the part, and/or combinations thereof. For example, a non-limiting list of modification that may be analyzed includes light intensity, pre-exposure delay, curing time or intensity, lattice dimensions (e.g., strut diameter), motor speeds, pump heights, resin heater temperature, slice thickness, oxygen parameters, part scaling, lattice and/or part design, print algorithms, types of resins, resin flow, resin viscosity, etc.

Though it is described herein that a change is incorporated to one set of parts and another set is unchanged, the embodiments described herein are not limited thereto. In some embodiments, both processes may be changed. For example, parameters of the "A" part and the "B" part may be varied within a stochastic range. In some embodiments, the variation may be controlled to occur within specific limits. For example, certain ranges of the variation may be configured so as not to overlap. For example, the process could be configured such that a particular parameter could be varied upward (increased) in both the "A" and "B" configurations or the particular parameter could be varied alternately in the "A" and "B" configurations (e.g., increase one and decrease the other), but the process may not be configured to decrease both the "A" and "B" configurations at the same time. This may allow for the injection of knowledge about the process to sweep a wider range of parameters while decreasing risk.

Though it is described herein that a change is incorporated to two sets of parts (or two sets of variations), the embodiments described herein are not limited thereto. In some embodiments, for example, a number of variations may be attempted simultaneously. For example, the configurations tested may include A, B, C, . . . N different configurations. For example, a first configuration may include a "legacy" (e.g., unchanged, or "incumbent") process and/or configuration (e.g., an "A" part), a second configuration may include a first variation of the legacy configuration (e.g., a "B" part), and a third configuration may include a second variation of the legacy configuration (e.g., a "C" part). The queuing system may allocate X percent of the print jobs to the B part, Y percent of the print jobs to the C part, and (100-X-Y) percent of the print jobs to the A part (e.g., the existing configuration). Similar allocations can be made to incorporate more than three (e.g., N) different options.

Utilizing multiple processes simultaneously may include additional benefits. For example, simultaneous testing may determine that both the B and the C parts are improvements over the A (legacy) part, but that one of the process variations (e.g., the B part) is better than the other process variation (e.g., the C part), which may provide important data in picking the next variation. As another example, in an effort to explore changes to a particular variable portion of the processes (e.g., curing time), one of the variations (e.g., the B part) may increase the value as compared to the legacy operation (e.g., increase the curing time) while another of the variations (e.g., the C part) may decrease the value as compared to the legacy operation (e.g., decrease the curing time). Such an experiment may determine that modifying the variable in one direction (e.g., increasing vs. decreasing) may have a more beneficial impact, and subsequent modifications may focus on changes in that particular direction. As previously discussed, a processing utilizing A, B, C, . . . , N variations is not limited to including a "legacy" or existing printing process as one of the printing options.

Figure 6:
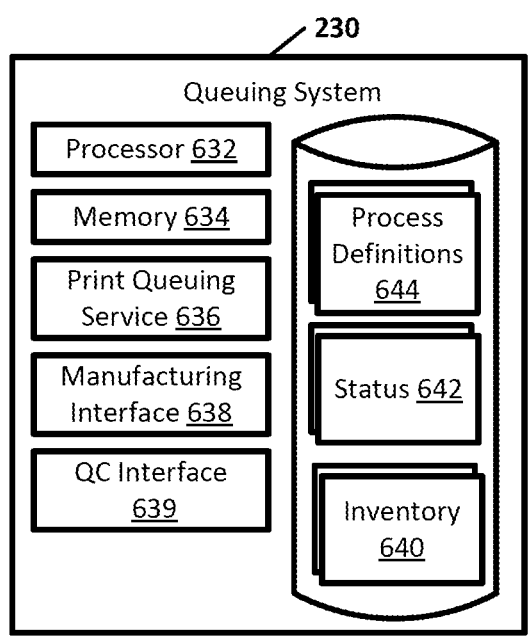
FIG. 6 is a schematic block diagram of an example of a queuing system configured to implement an improved printer queuing service, according to some embodiments of the invention.

FIG. 6 is a schematic block diagram of an example of a queuing system (230) configured to implement the printer queuing service, according to some embodiments of the invention. The queuing system (230) can include at least one data processor (632) and one or more memory elements (634). The queuing system (230) may use hardware, software implemented with hardware, firmware, tangible computer-readable storage media having instructions stored thereon, and/or a combination thereof, and may be implemented in one or more computer systems or other processing systems. The queuing system (230) may also utilize a virtual instance of a computer. As such, the devices and methods described herein may be embodied in any combination of hardware and software that may all generally be referred to herein as a "device," "circuit," "module," "component," and/or "system." Furthermore, aspects of the present invention may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following:

a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one processor (632) may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks.

The at least one processor (632) of the system (230) may be configured to execute computer program code for carrying out operations for aspects of the present invention, which computer program code may be written in any combination of one or more programming languages, including an object oriented programming language such as Java, Scala, Smalltalk, Eiffel, JADE, Emerald, C++, C#, VB.NET, or the like, conventional procedural programming languages, such as the "C" programming language, Visual Basic, PHP, ABAP, dynamic programming languages such as Python, PERL, Ruby, and/or other programming languages.

For instance, the program code of the queuing system (230) can include a print queuing service (636), among potentially other components. Process definitions (644) can be stored on the queuing system (230) that define the processes and equipment used to additively manufacture parts. The process definitions (644) may include part information as well as part structures used for individually manufactured parts. The print queuing service (636) may perform modifications of the additive manufacturing process and perform allocations of the modifications to achieve the process improvements, as described herein.

Status data (642) may be maintained for the queuing system (230) and may include status data (642) for individual ones of the manufactured parts. A QC interface (639) may provide a way to retrieve and query data from the QC process and may be stored as part of the status data (642). The status data (642) may be used, as described herein, to determine whether a particular process modification was beneficial and/or successful.

Inventory data (640) may be generated by the queuing system (230) that includes data related to the types and/or addresses of devices within the manufacturing system. The inventory data (640) may be retrieved, for example, by a manufacturing interface (638). The inventory data (640) may be used to schedule and/or allocate parts among the devices of the additive manufacturing system. The inventory data (640) may also include indications of variations in the materials and/or devices of the additive manufacturing system, which may be used to assist in scheduling materials and/or devices for the process variations described herein. The inventory data (640) may also include information related to parts being manufactured in the additive manufacturing system, including the data (such as unique identifiers described herein with respect to FIGS. 1A and 1B) for parts and/or inventory currently in in process in the additive manufacturing system.

Data storage or memory of the queuing system (230) can be on separate (volatile and/or non-volatile) memory devices located locally or remotely, partitioned sections of a single memory device, etc., including combinations thereof (e.g., a remote back-up memory in addition to a local memory). For example, the data storage referred to herein may be one or more databases stored locally to the queuing system (230) or remote. In some embodiments, the database may be remotely accessible by the queuing system (230).

The foregoing is illustrative of the present invention, and is not to be construed as limiting thereof. The following claims are provided to ensure that the present application meets all statutory requirements as a priority application in all jurisdictions and shall not be construed as setting forth the scope of the present invention.

The invention claimed is:

1. A method of improving production performance for a batch of objects being made by additive manufacturing, comprising:
    (a) providing: (i) a fleet of additive manufacturing apparatus on which said batch of said objects are produced, and (ii) a current production plan for said objects that is implemented on each individual apparatus in said fleet;
    (b) providing a proposed production plan for said objects;
    (c) randomly distributing a first and second group of print jobs for said batch of said objects among said fleet of additive manufacturing apparatus, with the first group to be produced by said current production plan and comprising X percent of total print jobs, and with the second group to be produced by said proposed production plan and comprising 100-X percent of the total print jobs;
    (d) assigning a unique identifier to each of said objects in said first and second group of print jobs;
    (e) producing said objects of said first and second group on said fleet of additive manufacturing apparatus;
    (f) comparing a production performance of said first and second groups of print jobs based on (i) at least one predetermined performance characteristic and (ii) the unique identifier assigned to each of said objects; and then
    (g) if the production performance of said second group exceeds that of said first group, producing a subsequent batch of said objects on said fleet of additive manufacturing apparatus, with a greater proportion of said objects, or all of said objects, produced by said proposed production plan than by said current production plan.

2. The method of claim 1, wherein said step (g) is carried out by: repeating steps (c) through (f) at least once with X reduced, until either X is reduced to zero, or no production performance improvement for said proposed production plan is found.

3. The method of claim 1, wherein said proposed production plan is algorithmically generated from said current production plan.

4. The method of claim 1, wherein each of said objects in said first and second groups are produced free of any indicia of the group to which they belong so that said comparing step (f) is carried out blind based on the unique identifier of each of said objects.

5. The method of claim 1, wherein:
said proposed production plan comprises a process change;
multiple copies of said objects are produced simultaneously on each additive manufacturing apparatus in said fleet;
objects produced simultaneously on each individual additive manufacturing apparatus in said fleet are in the same group; and
multiple runs of said objects are produced on each individual additive manufacturing apparatus, with said objects of subsequent runs belonging to either a different group, or a randomly assigned group, as compared said the objects in a preceding run on that additive manufacturing apparatus.

6. The method of claim 1, wherein said proposed production plan comprises a product feature change; and
each individual additive manufacturing apparatus in said fleet is randomly assigned print jobs from both groups.

7. The method of claim 1, wherein said producing step (e) and said comparing step (f) are both carried out until a predetermined threshold of production performance improvement is reached.

8. The method of claim 1, wherein said fleet of additive manufacturing apparatus each produce said objects by light polymerization of a resin, and said resin is provided to said additive manufacturing apparatus from a plurality of separate resin lots.

9. A print queuing system for a batch of objects being made by additive manufacturing, comprising:
a processor; and
a memory coupled to the processor and comprising computer readable program code that when executed by the processor causes the processor to perform operations comprising: (a) providing: (i) a fleet of additive manufacturing apparatus on which a batch of said objects are produced, and (ii) a current production plan for said objects that is implemented on each individual apparatus in said fleet;
(b) providing a proposed production plan for said object;
(c) randomly distributing a first and second group of print jobs for said batch of objects among said fleet of additive manufacturing apparatus, with the first group to be produced by said current production plan and comprising X percent of total print jobs, and with the second group to be produced by said proposed production plan and comprising 100-X percent of total print jobs;
(d) assigning a unique identifier to each said object in said first and second group of print jobs;
(e) producing said objects of said first and second group on said fleet of additive manufacturing apparatus;
(f) receiving a comparison result of a comparison between production performance of said first and second groups of print jobs based on (i) at least one predetermined performance characteristic and (ii) the unique identifier assigned to each object; and then
(g) if the production performance of said second group exceeds that of said first group, producing a subsequent batch of said objects on said fleet of additive manufacturing apparatus, with a greater proportion of said objects, or all of said objects, produced by said proposed production plan than by said current production plan.

10. A computer program product for improving production performance of an additive manufacturing system, the computer program product comprising a non-transitory computer readable storage medium having computer readable program code embodied in the medium that when executed by at least one processor causes the at least one processor to perform operations comprising the method of claim 1.

11. The method of claim 1, wherein the proposed production plan comprises a process change and/or a product feature change from the current production plan.

12. The method of claim 11, wherein the process change comprises a change to light intensity, exposure time, pre-exposure delay, pump height, curing time, curing intensity, resin heater temperature, oxygen parameters, types of resins, resin flow, and/or resin viscosity.

13. The method of claim 11, wherein the product feature change comprises lattice dimensions, slice thickness, part scaling, lattice and/or part design.

14. The method of claim 1, wherein said proposed production plan is a first proposed production plan, the method further comprising:
(h) if the production performance of said second group does not exceed that of said first group, producing a subsequent batch of said objects on said fleet of additive manufacturing apparatus, using a second proposed production plan, said second proposed production plan differing from said first proposed production plan.

15. The method of claim 14, wherein said first proposed production plan comprises a first modification applied to said objects, and said second proposed production plan comprises a second modification applied to said objects.

16. The system of claim 9, wherein the proposed production plan comprises a process change and/or a product feature change from the current production plan.

17. The system of claim 16, wherein the process change comprises a change to light intensity, exposure time, pre-exposure delay, pump height, curing time, curing intensity, resin heater temperature, oxygen parameters, types of resins, resin flow, and/or resin viscosity.

18. The system of claim 16, wherein the product feature change comprises lattice dimensions, slice thickness, part scaling, lattice and/or part design.

19. The system of claim 9, wherein said proposed production plan is a first proposed production plan, the memory storing further computer readable program code that when executed by the processor causes the processor to perform further operations comprising:
(h) if the production performance of said second group does not exceed that of said first group, producing a subsequent batch of said objects on said fleet of additive manufacturing apparatus, using a second proposed production plan, said second proposed production plan differing from said first proposed production plan.

20. The system of claim 19, wherein said first proposed production plan comprises a first modification applied to said objects, and said second proposed production plan comprises a second modification applied to said objects.

* * * * *